Patented Dec. 31, 1935

2,025,776

UNITED STATES PATENT OFFICE 2,025,776

METHOD OF MANUFACTURING FUEL BRIQUETTES

Arthur A. Roberts, London, England; Arthur Roberts, Wanstead, England, and Clifford Wilbur Smith, Maida Vale, England, administrators of said Arthur A. Roberts, deceased No Drawing. Application November 2, 1933, Serial No. 696,436. In Great Britain October 26, 1932

2 Claims. (Cl. 44—10)

The present invention relates to improvements in the manufacture of artificial fuel in the form of blocks or briquettes from carbonaceous material, such as coal, coke, sawdust, tan bark, peat, lignite, anthracite, carbonaceous residuums and the like materials.

The invention is more particularly concerned with the baking of such briquettes. Such baking is frequently employed for the purpose of reducing the smoke producing propensities and is necessary where the bonding agent or a part of the bonding agent, consists of bituminous substances or other organic compounds, or where the carbonaceous material itself contains bonding components of a bituminous character.

According to the invention the vapors and gases evolved during the baking operation are passed into contact with and preferably between the particles of the material to be briquetted. This results in a condensation of some of the vapors on the material to be briequetted thus making the process more economical and rendering the effluent gases less objectionable. Where the material to be briquetted is coal, the swelling power is reduced by this operation.

The method of heat treatment of fuel briquettes according to the present invention consists in heating or baking them to a temperature not exceeding 500° Fahrenheit and preferably to a temperature not exceeding 300° Fehrenheit, for such a short time as only to decompose substances capable of producing smoke on or near the surface.

The method of the present invention also consists in heating the briquettes for a period of time not exceeding one hour at a temperature well below the ignition temperature of the briquettes.

In general, the time of heating is between half an hour and one hour and the temperature between 200 and 350° Fahrenheit depending upon the proportion of smoke-producing ingredients and upon the ignition temperature of the briquette as a whole.

This heat treatment further has the advantage of helping and accelerating the setting of the bonding material which is preferably cement not exceeding 5% by weight of cement and bitumen together not exceeding 12 per cent. by weight.

This preliminary heat treatment of the briquette also makes it harder and gives it better weathering properties.

By way of example in the making of a solid fuel briquette for use in a domestic open grate, anthracite coal reduced by grinding to pass a 30 mesh per linear inch sieve, (in which case of course the powdered coal contains dust of a finer grade) is mixed with or ground to this fineness with 3% of cement, 1% of 40 to 50 degrees penetration (Penetrometer scale) bitumen, ½% of boric acid, and ¼ of 1% of starch emulsified in 8% by weight of water is then sprayed into the mass of powdered coal and intimately mixed with it, the resultant mixture passing straight away (i. e. before the cement is set) to a press exerting a pressure of 2000 to 4000 lbs. per square inch on the moulded cake which is conveniently of the shape of a double pyramidal block of say two to three inches square.

The moulded briquettes are then baked in an oven at a temperature of about 400° Fahrenheit for about one hour when they are ready for use.

The vapors evolved during the baking operation can be passed into the mass of powdered coal to condense therein for instance during its grinding or mixing with the cement binder so that no combustible volatile matter is wasted in the process.

I declare that what I claim is:—

1. A method of manufacturing non-smoking fuel briquettes from solid carbonaceous combustible, which consists in mixing the carbonaceous combustible in powdered form with a binder, moulding briquettes therefrom, baking the briquettes to decompose smoke-producing agents in the portions of the briquettes adjacent to the surfaces thereof alone, and passing the evolved vapors therefrom through masses of fresh solid carbonaceous combustible for effecting a condensation of evolved volatile products from said vapors within the masses of said fresh combustible prior to the moulding thereof into fresh briquettes.

2. A method of manufacturing non-smoking fuel briquettes from solid carbonaceous combustible, consisting in grinding the carbonaceous combustible with a binder, moulding briquettes therefrom, baking the briquettes to decompose smoke-producing agents in the portions of the briquettes adjacent to the surfaces thereof alone, and passing the evolved vapors therefrom through masses of fresh solid carbonaceous combustible during the grinding step for effecting a condensation of evolved volatile products from said vapors within the masses of said fresh combustible.

ARTHUR A. ROBERTS.